O. & A. OLSON.
TRUCK.
APPLICATION FILED DEC. 29, 1916.
1,244,238.
Patented Oct. 23, 1917.
3 SHEETS—SHEET 3.
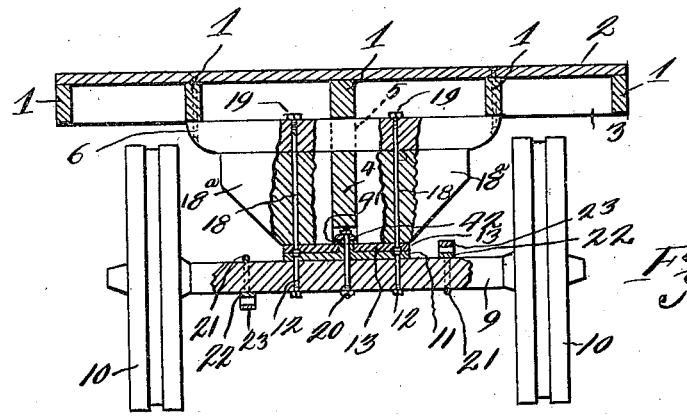
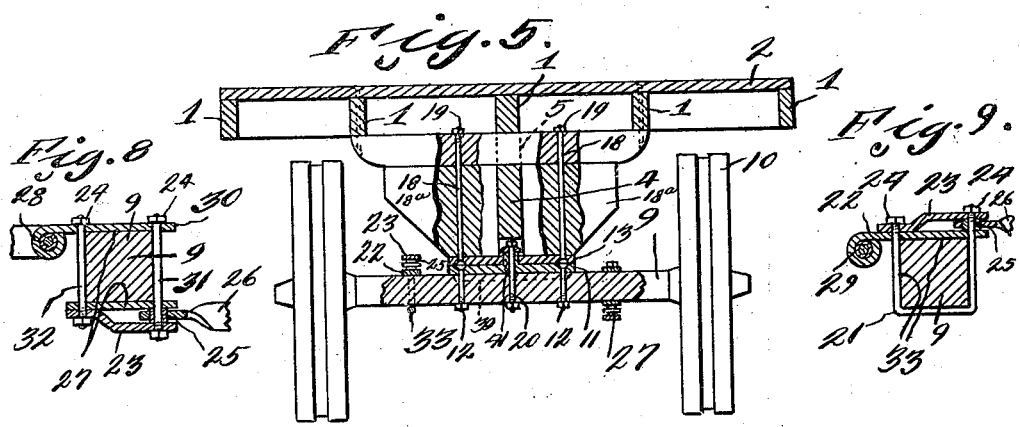
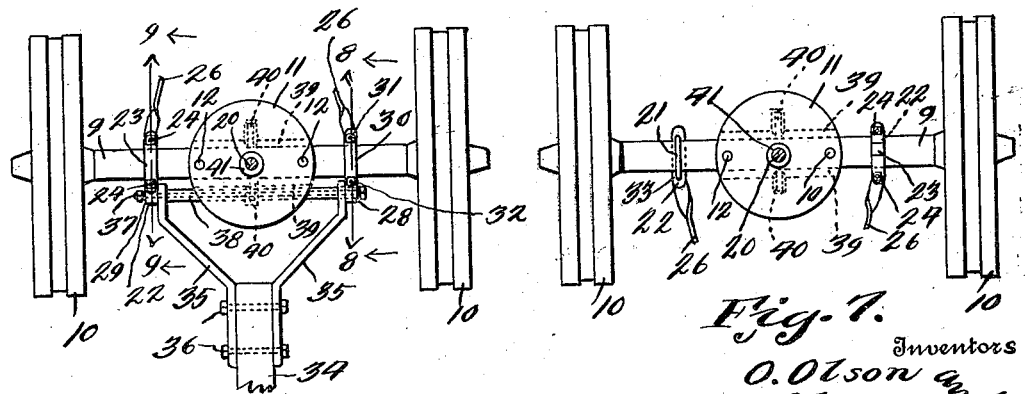
Witnesses
Philip Sewell
Frances M. Bowell
Inventors
O. Olson and
A. Olson
By D. Swift & Co.
their Attorneys

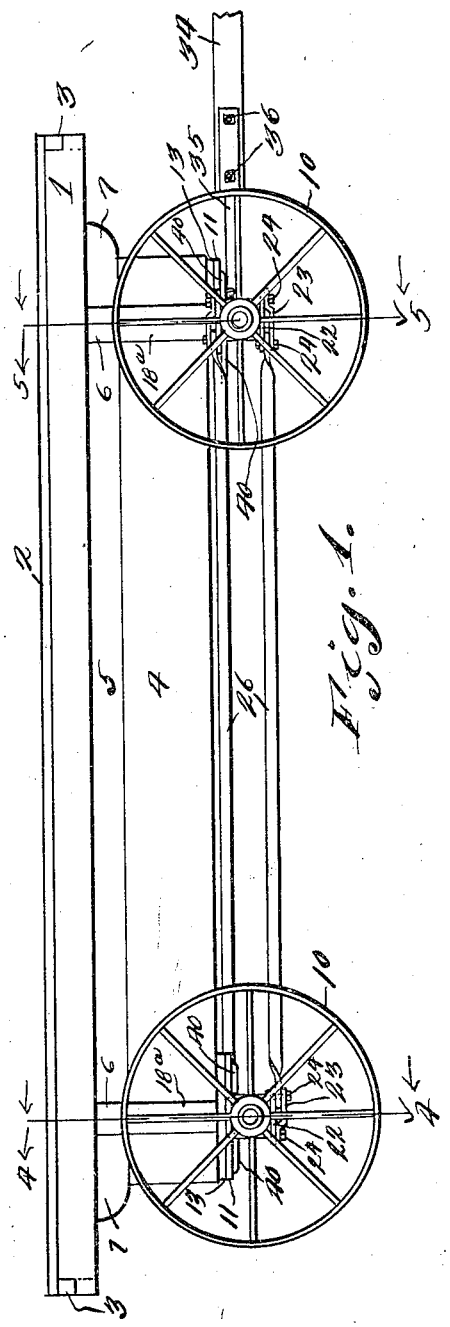

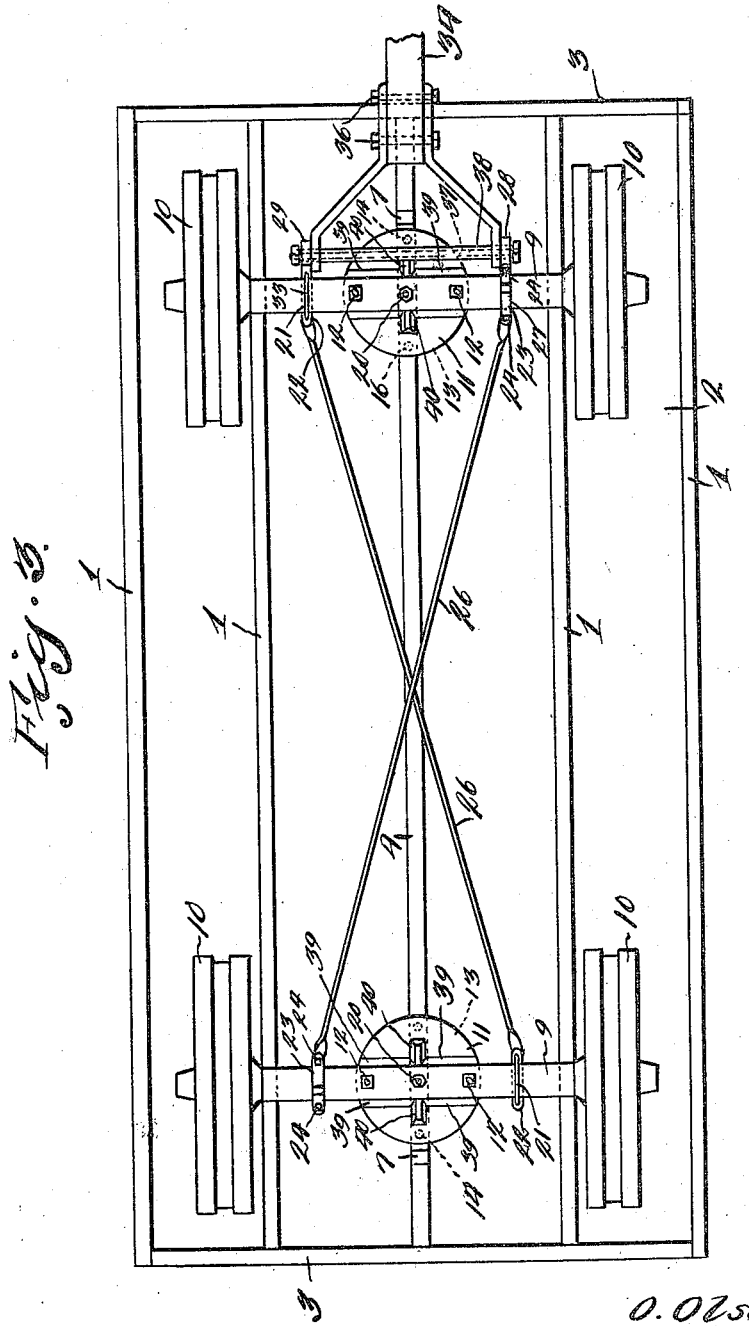

UNITED STATES PATENT OFFICE.

OLOF OLSON AND ANDREW OLSON, OF KINGSBURG, CALIFORNIA.

TRUCK.

1,244,238. Specification of Letters Patent. Patented Oct. 23, 1917.

Application filed December 29, 1916. Serial No. 139,660.

*To all whom it may concern:*

Be it known that we, OLOF OLSON and ANDREW OLSON, citizens of the United States, residing at Kingsburg, in the county of Fresno, State of California, have invented a new and useful Truck; and we do hereby declare the following to be a full, clear, and exact description of the invention, such as will enable others skilled in the art to which it appertains to make and use the same.

This invention relates to trucks and is particularly a truck for use in vineyards and places where short turns are required.

An object of the invention is to provide a device of this kind having bars that will perform double functions such as acting as reach bars and steering means for the rear axle. These reach bars are made flexible, so that they may give and bend without breaking and will return to their original shape when the strain which causes them to bend is removed. The invention is further directed to the reduction of the number of accidents resulting from the breaking of the reach when straightening a truck after a sharp turn is made with most of the load on one side, as the flexibility of the reach bars adapts them to adjust themselves quickly to all variations of strain, such as irregularities of the ground. The manner of construction precludes the binding or friction of the cross reachers and the truck as a whole is designed particularly to meet the needs peculiar to orchards.

In the drawings:—

Figure 1 is a side elevation of the invention.

Fig. 2 is a longitudinal section taken vertically through the center of the truck.

Fig. 3 is a bottom plan view.

Fig. 4 is a transverse sectional view on line 4—4 of Fig. 1 through the rear axle and turn table.

Fig. 5 is a transverse section through the forward axle and turn table on line 5—5 of Fig. 1.

Fig. 6 is a plan of the front axle and turn table.

Fig. 7 is a plan of the rear axle and turn table.

Fig. 8 is a sectional view on line 8—8 of Fig. 6 showing the method of connecting one cross reach to the front axle.

Fig. 9 is a sectional view on line 4—4 of Fig. 6, showing the structure for connecting the other cross reach to the axle.

In the drawings,—the truck platform is composed of the longitudinal timbers 1 and the timbers 2, the timbers 3 binding the timbers at either end. The longitudinal reach 4 extends from the forward turn table to the rear turn table and between it and the truck platform the longitudinal timber 5 intervenes. The cross pieces 6 act as bolsters for the platform over both the forward and rear axles. The short pieces 7 resting on the ends of the reach 4 abut the cross pieces 6 and adjoin the central longitudinal timber 1 of the platform.

On the axles 9 the wheels 10 are secured in any conventional manner and at the center of the axle the bottom half 11 of the turn table is secured by the bolts 12. The upper half 13 of the turn table is secured to the reach 4 and the truck platform by four bolts, a bolt 14 passing through the reach 4 the short piece 7 and the central longitudinal timber 1 and being secured on top of the platform by a nut 15. The platform at this point is countersunk to the nut. The bolt 16 is diametrically opposite the bolt 14 and secures the upper half 13 of the turn table only to the reach 4, a slot in 4 making room for the nut 17. The bolts 18 serve to fasten 13 to the cross piece 6 and in so doing pass through the pieces 18ª which serve to partly transmit the weight of the body to the axle. The nuts 19 act as a securing means for the bolts 18 on the upper edge of the cross piece 6. The king-bolt 20 connects the two halves 11 and 13 of the turn table together, the reach 4 being recessed to make room for the head of the bolt and its attendant washer.

On either side of the turn table is a clamping device composed of the stirrup 21 which fits around the axle 9. Over the ends of 21 a piece 22 rests and on top of 22 is a circular piece 23 the ends of which are offset. Parts 22 and 23 are secured firmly to the axle by the nuts 24 on the ends of the stirrup 21, an annular spacing means 25 intervening between 22 and the offset end of 23. The ends of the cross-reaches 26 connect with these stirrups at 25, the ends of these reaches being given a quarter turn and fitted with an eye suitable to permit them to swivel on 25. These clamping devices on either side of the same axle are oppositely applied. They are so disposed on the two axles that the clamping devices similarly mounted are on opposite sides of the two axles. The reaches 26 are diagonally connected between the clamps on the front and rear axles and, as a result of the manner in which the clamps are secured to the axles, one reach extends from the bottom of the front axle diagonally to an equivalent position on the rear axle. The other reach connects in like manner between the tops of the two axles.

In order to provide means for connecting the tongue 34 to the truck, the clamping device 27 is made slightly different from the rest. A cross piece 30 which has an eye 28 formed in its end takes the place of the stirrup 21, the bolts 31 and 32 taking the place of the parallel sides of this stirrup. Clamping device 33 differs from the two remaining devices in that the piece 22 has formed in its end an eye 29 similar to 28 formed in the piece 30. The tongue 34 is secured to these eyes by means of the angle pieces 35 which are held to the tongue by bolts 36. Pieces 35 diverge and are connected to the eyes 28 and 29 by means of the bolt 37 which passes through holes formed in the ends of these pieces and through a tubular spacer 38.

The turn-table which forms one of the vital features of this device is so constructed that its lower plate 11 is provided with the flanges 39 which parallel and hug the axle. Ribs 40 emanate from the center of these flanges and their purpose is to give additional strength to the bottom plate 11. At its center plate 11 is provided with a tubular boss 41 through which the king bolt 20 passes, the upper plate 13 having a central eye adapted to set over this boss and underneath the washer 42 of the king bolt.

The front and rear axle of this truck are substantially identical, the only difference being the changes in the structure of the clamping devices on the front axle to provide for the clamping of the tongue thereto. Cross reach rods 26 are prevented from engaging each other as they are attached to opposite sides of the axles which they connect. When the front axle is turned by any lateral force supplied by the tongue, the reverse of this movement is applied to the rear axle by reason of the cross-reaches connected to opposite ends of the two axles. The two axles thus turning toward each other bring the truck wheels into a position to make a shorter turn than if one axle alone moved.

The advantage of the turn-table described is apparent when it is pointed out that the boss 41 by protruding through the plate 13 protects the king-pin 20 from the wear to which it would be subjected if this boss were not present. The height of this boss prevents the king-bolt from binding the plates 11 and 13 of the turn-table.

Having thus described the invention, what is claimed is:

1. In a running gear for trucks, a platform body having an elongated beam extending centrally longitudinally thereof, a reach adjacent the under edge of said beam, a bolster connected to said reach and extending transversely thereof, a second bolster on which the first bolster rests, a second reach below and adjacent the first reach and passing through the second bolster, an axle, and a swivel connection between the axle and the second bolster.

2. In combination, front and rear running gears, front and rear axles having fifth wheel connections with the running gear, diagonal cross reaches, one above each other connecting said axles, means connecting said reaches to the axles comprising U-shaped members straddling the axle upwardly, a plate on top of the axle receiving the arms of the U-shaped member, a sleeve on one of said arms passing through an end of one of the reaches, and a second plate receiving the arms of said U-shaped member, and means threaded on the arms to hold the second plate in place.

In testimony whereof we have signed our names to this specification in the presence of two subscribing witnesses.

OLOF OLSON.
ANDREW OLSON.

Witnesses:
O. ED. PETERSON,
C. F. DRAPER.